United States Patent [19]

Takada

[11] Patent Number: 4,577,888
[45] Date of Patent: Mar. 25, 1986

[54] SEAT BELT ANCHOR ASSEMBLY

[76] Inventor: Juichiro Takada, 12-1, 3 chome, Shinmachi, Setagaya-ku, Tokyo, Japan

[21] Appl. No.: 598,841

[22] Filed: Apr. 10, 1984

[30] Foreign Application Priority Data

Apr. 11, 1983 [JP] Japan .......................... 58-052666[U]

[51] Int. Cl.[4] ...................... A62B 35/00; B60R 21/10
[52] U.S. Cl. .................................. 280/808; 280/801; 297/483
[58] Field of Search .............. 280/801, 805, 808, 804, 280/806; 297/468, 483, 484

[56] References Cited

U.S. PATENT DOCUMENTS

| 4,056,282 | 11/1977 | Nordh ................................. 297/389 |
| 4,398,749 | 8/1983 | Hipp et al. .......................... 280/808 |
| 4,470,618 | 9/1984 | Ono .................................... 280/808 |

Primary Examiner—Richard A. Bertsch
Attorney, Agent, or Firm—Brumbaugh, Graves, Donohue & Raymond

[57] ABSTRACT

A seat belt anchor assembly comprises a rail having a plurality of longitudinally spaced-apart stepped holes, a tubular slider slidably received on the rail and surrounding it, an anchor ring for guiding the belt and a latch assembly carried by the slider and having a pin selectively engageable with and disengageable from each of the holes in the rail by operation of an element of the pin projecting out from the slider.

3 Claims, 16 Drawing Figures

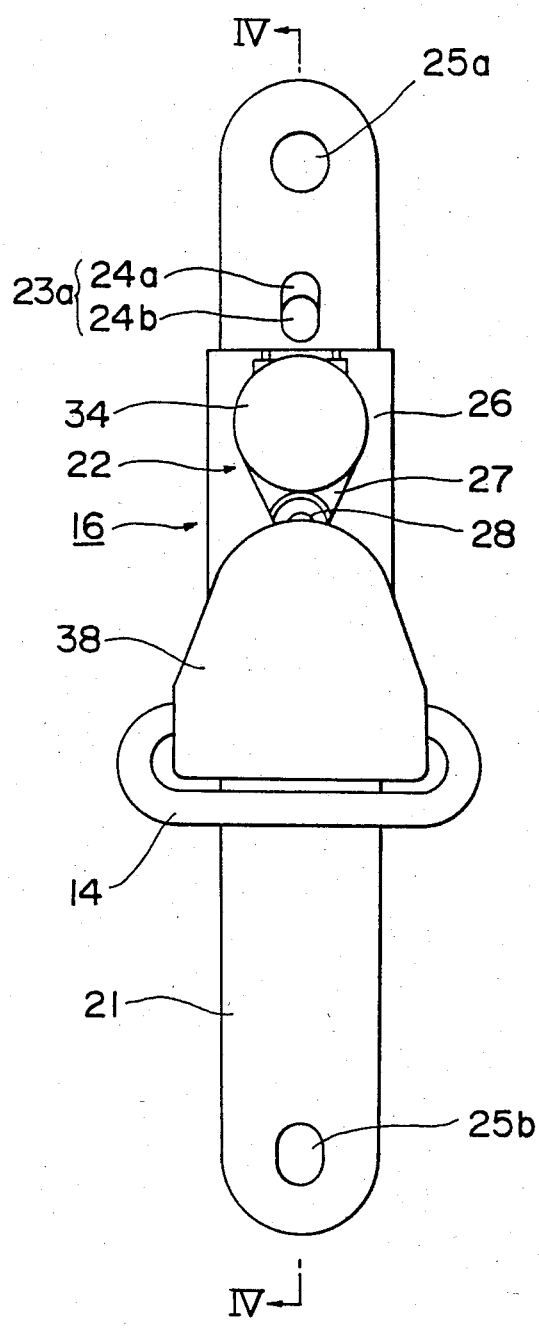
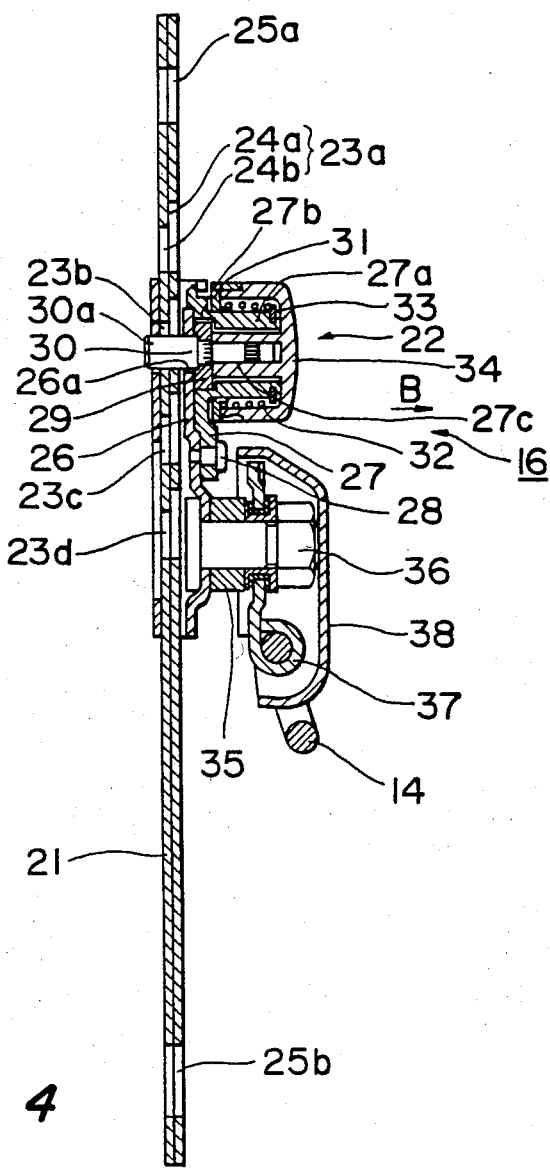
FIG. 3
FIG. 4

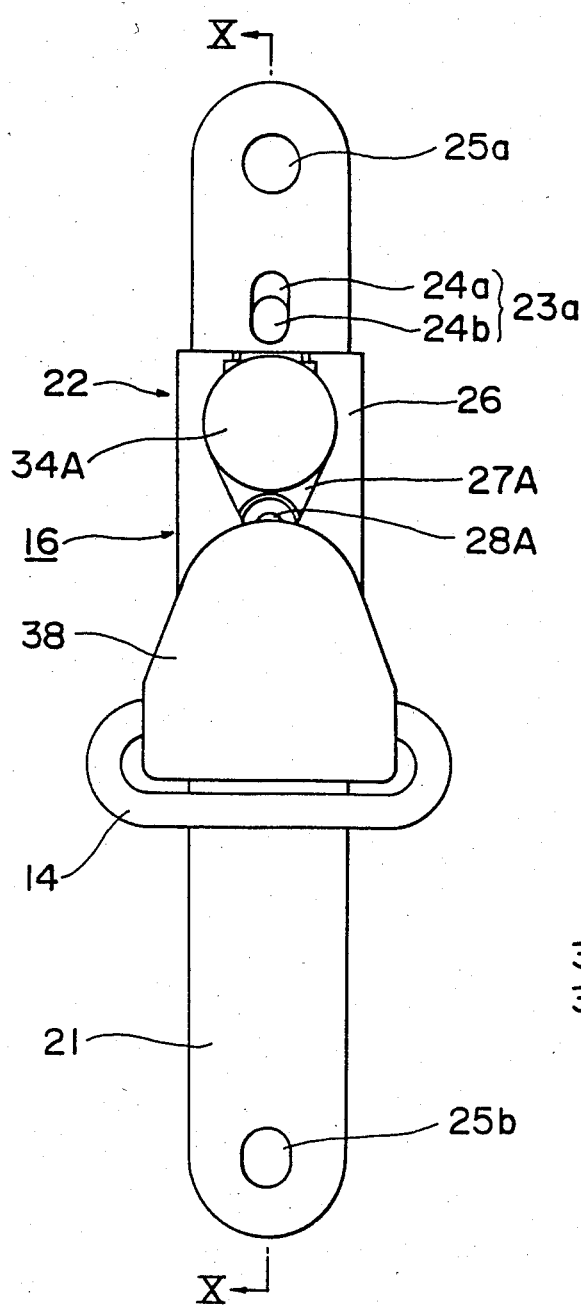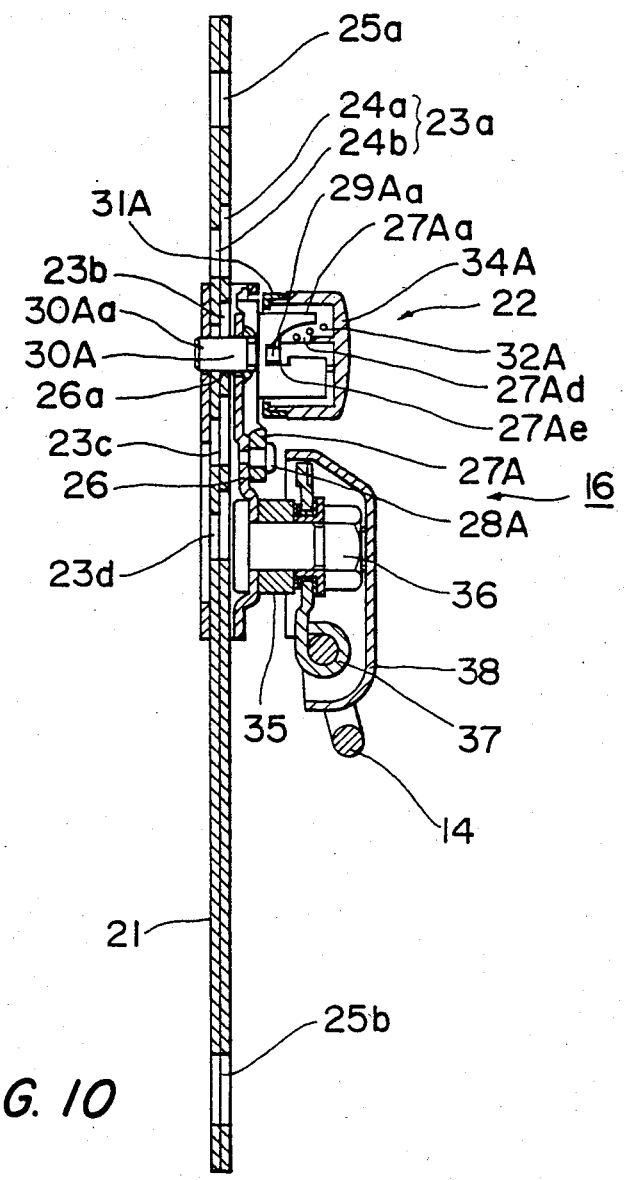
FIG. 9
FIG. 10

SEAT BELT ANCHOR ASSEMBLY

DECRIPTION

1. Field of the Invention

The present invention relates to vehicle safety belt systems and, in particular, to a belt anchor assembly that is mounted on the center pillar of a vehicle body and is constructed to enable the height of the anchor to be adjusted so that a shoulder belt connected to the anchor fits the particular seat occupant comfortably and effectively.

2. Background of the Invention

A very common type of seat belt system used in passenger cars and other automotive vehicles includes a shoulder belt that leads from an anchor affixed to the center pillar of the vehicle body at a location outboard of, above and behind the shoulder of the occupant of the seat inwardly and downwardly across the torso of the occupant to a buckle or other fastening device located adjacent the lower rear of the seat. It has been proposed in the past that the belt anchor on the center pillar be mounted for adjustment of its position in the vertical direction so that the shoulder belt will fit better to the physique of the particular occupant.

FIG. 1 of the accompanying drawings illustrates a known adjustable belt anchor of the type used on the center pillar P of a vehicle for the upper outboard end of a shoulder safety belt. A reinforcing plate 3 having a multiplicity of vertically spaced-apart notches 2 is installed within the center pillar adjacent a slot 1 in the pillar. A locking plate 5 having a pair of vertically spaced-apart forwardly projecting flanges 4 is received behind the reinforcing plate 3 with the flanges received in a selected adjacent pair of the notches 2. A saucer-shaped spring 9 is engaged under compression between the head of the bolt 8 and the anchor 7 and allows the anchor to be repositioned along the reinforcing plate 3 by pushing in on the head of the bolt, thereby deforming the spring 9, pushing rearwardly on the nut and locking plate and disengaging the flanges 4 from the notches 2. The anchor assembly can then be adjusted up or down, and upon release of pressure on the bolt head, the spring 9 pulls the nut and the locking plate 5 forwardly to position the flanges 4 in another pair of notches 2. This anchoring arrangement is somewhat unstable because of the presence of the spring 9, and inward components of force on the belt 6 can easily overcome the spring force and produce rocking and cocking motion of the assembly relative to the desired stable position in engagement with the reinforcing plate.

SUMMARY OF THE INVENTION

An object of the present invention is to eliminate the instability of an adjustable belt anchor of the type shown in FIG. 1 of the accompanying drawings and to provide an adjustable belt anchoring assembly that is easy to operate, is reliable and stays in position without rocking or cocking as a result of forces on the belt or other causes.

The foregoing and other objects of the invention are attained by an anchor assembly comprising a rail, a slider movable along the rail, a locking arrangement by which the slider is latched to the rail against movement from the selected position and an anchor ring connected to the slider for guiding the belt. The present invention is characterized in that the slider is a tubular member that surrounds the rail, in that the rail has a plurality of longitudinally spaced-apart holes and in that the locking arrangement is an operating assembly carried by the slider that includes a latch pin selectively engageable with any of the holes in the rail and disengageable therefrom by operating on an element of the pin that projects out from the slider.

Preferred embodiments of the invention are further characterized in that each of the holes in the rail is stepped, the front portion being elongated axially of the rail and the back portion being of regular shape. Further, in the engaged position, the latch pin extends through holes in the front and back walls of the slider as well as through a hole in the rail for good load distribution.

The arrangement of a rail and a tubular slider surrounding the rail enables savings in manufacturing costs. The rails can be made of light steel plates by stamping. The sliders can also be stamped and then bent to make them tubular. The provision of an operating assembly that operates independently of the forces on the belt ensures stable and certain positioning of the slide, despite vibrations, belt forces, and abrupt movements of the vehicle. The stepped holes make adjustment easier by making it hard, if not impossible, for the lock pin to overrun a hole when the slider is being repositioned. By having the lock pin extend through the holes in the front and back walls of the slider, the forces acting between the pin and the slider and rail are distributed; the pin is well supported under load and cannot bend over and be forced out of the hole in the rail.

For a better understanding of the invention, reference may be made to the following description of exemplary embodiments, taken in conjunction with the figures of the accompanying drawings.

DESCRIPTION OF THE DRAWINGS

FIG. 3 is a front elevational view of an exemplary embodiment of a seat belt anchor assembly according to the present invention;

FIG. 4 is a side cross-sectional view of the embodiment of FIG. 3 taken along the line IV—IV of FIG. 3;

FIG. 9 is a front elevational view of another embodiment of the invention;

FIG. 10 is a side cross-sectional view of the embodiment of FIG. 9 taken along the lines X—X of FIG. 9;

DESCRIPTION OF THE EMBODIMENTS

Figure 1:
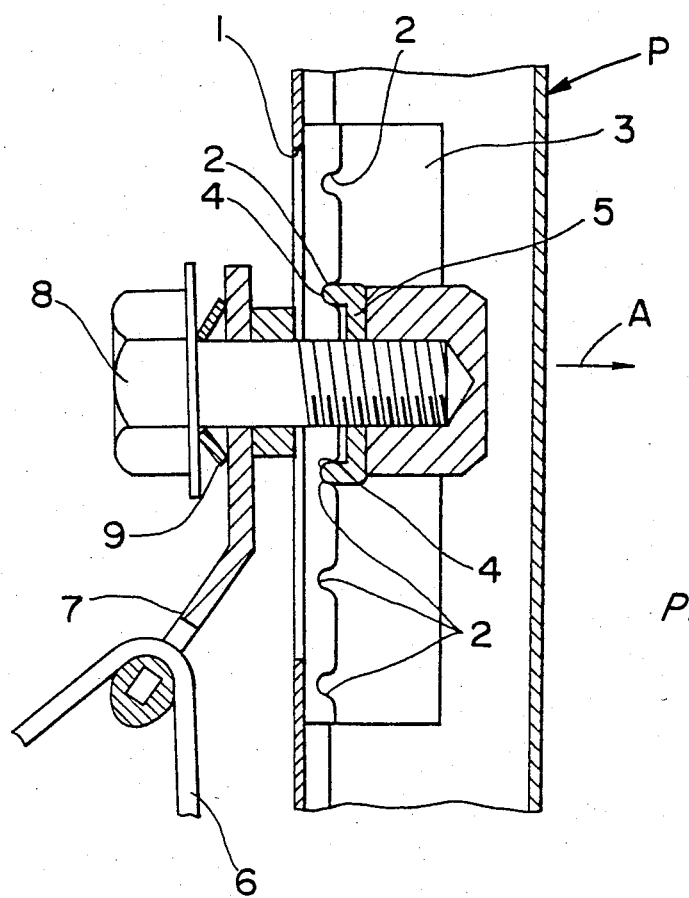
FIG. 1, as described above, is a side cross-sectional view of an anchor assembly known in the prior art.
Figure 2:
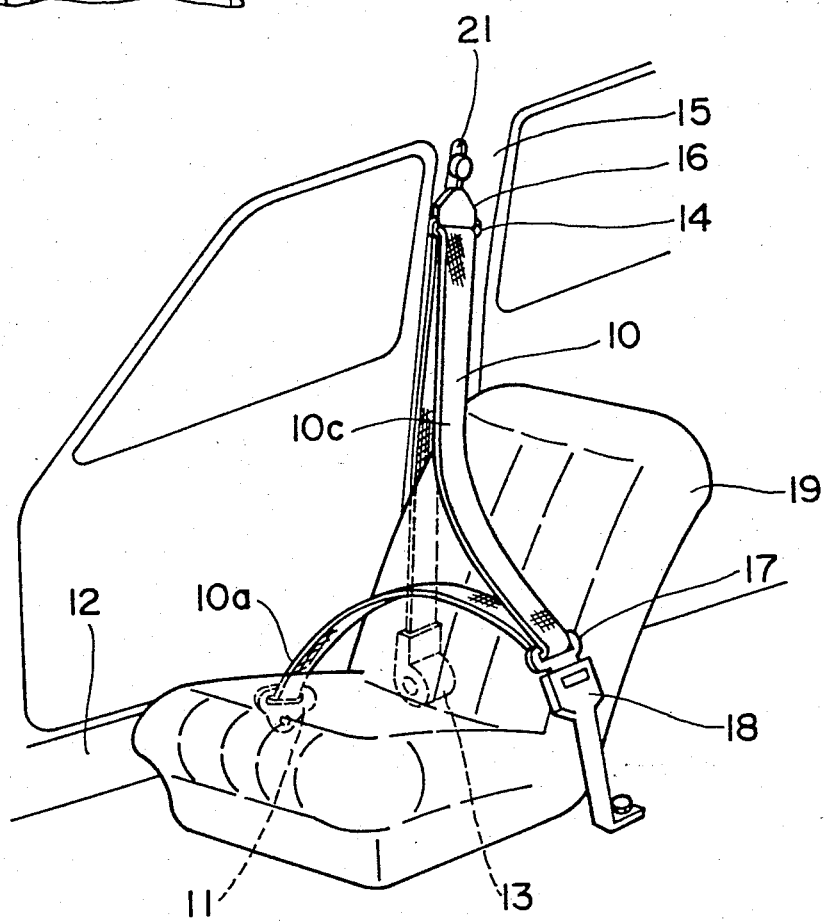
FIG. 2 is a pictorial view in generally schematic form of a conventional seat belt system for which the present invention is well suited.

In the seat belt system shown in FIG. 2, a continuous rstraint belt 10 leads from an emergency locking retractor 13, which is mounted near the lower end of the center pillar 15, upwardly along the pillar 15, passes through an anchor ring member 14, turns downwardly and inwardly across the vehicle seat 19, passes through a buckle tongue 17 and then leads back outwardly across the seat to an anchor 11 affixed to the rocker panel 12, at a position near the lower rear outboard portion of the seat. The buckle tongue 17 is received within a buckle 18 that is affixed to the vehicle floor adjacent the lower rear inboard side of the seat. The portion 10c of the belt extending between the anchor member 14 and the buckle tongue 17 is a shoulder belt that engages the torso of the seat occupant, and the portion 10a of the belt that extends across the seat between the buckle tongue 17 and the anchor member 14 is a lap belt for restraining the lower body of the occupant. This system is well known and is in widespread use in commercially available motor vehicles. In accordance with the present invention, an anchor assembly 16, of which the anchor member forms a part, is adjustable in respect of its height above the seat, thereby enabling the shoulder portion 10c of the belt to be fitted properly and comfortably to occupants of various statures and physiques.

Figure 5:
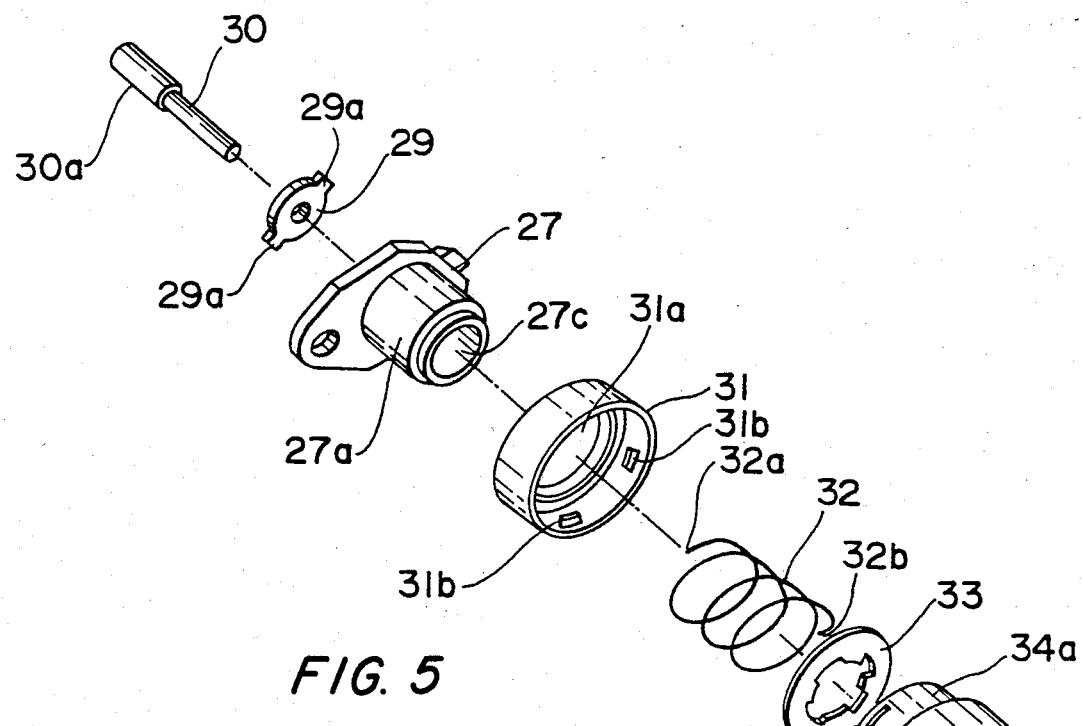
FIG. 5 is an exploded pictorial view of the operating mechanism of the embodiment of FIGS. 3 and 4.
Figure 6:
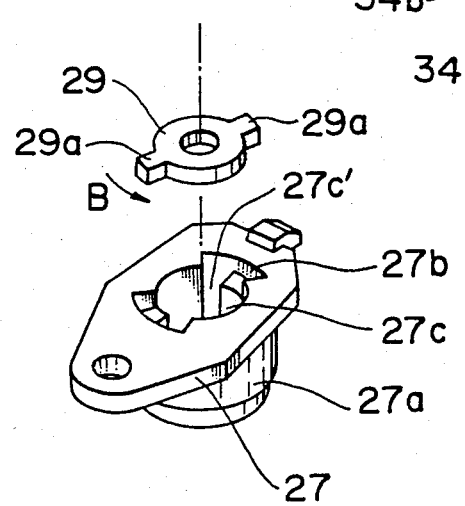
FIG. 6 is an exploded pictorial view of the stopper and the retainer of the embodiment of FIGS. 3 and 4.
Figure 7:
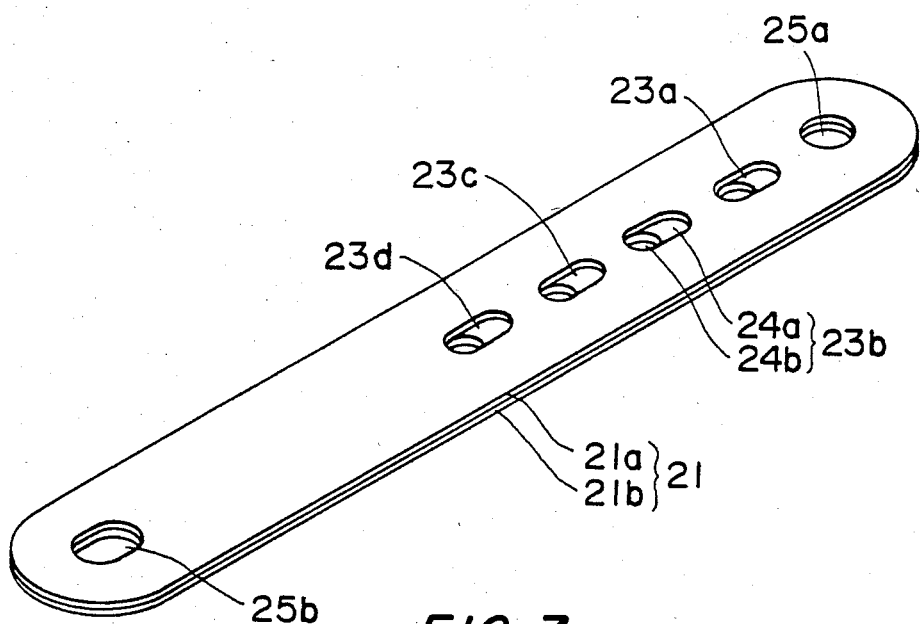
FIGS. 7 and 8 are pictorial views of modified rail members suitable for use in the present invention.
Figure 8:
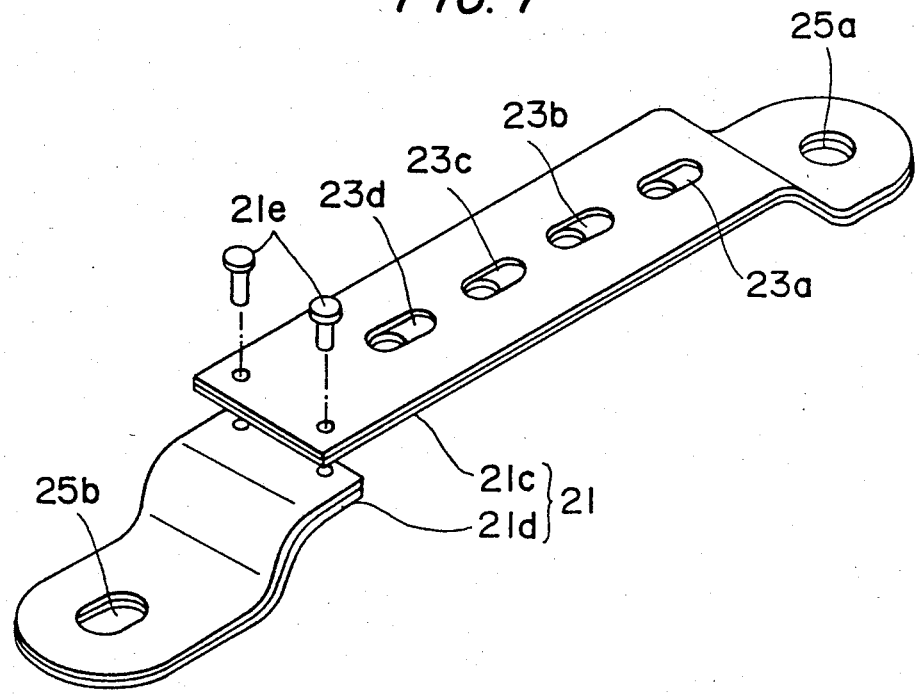
Figure 11:
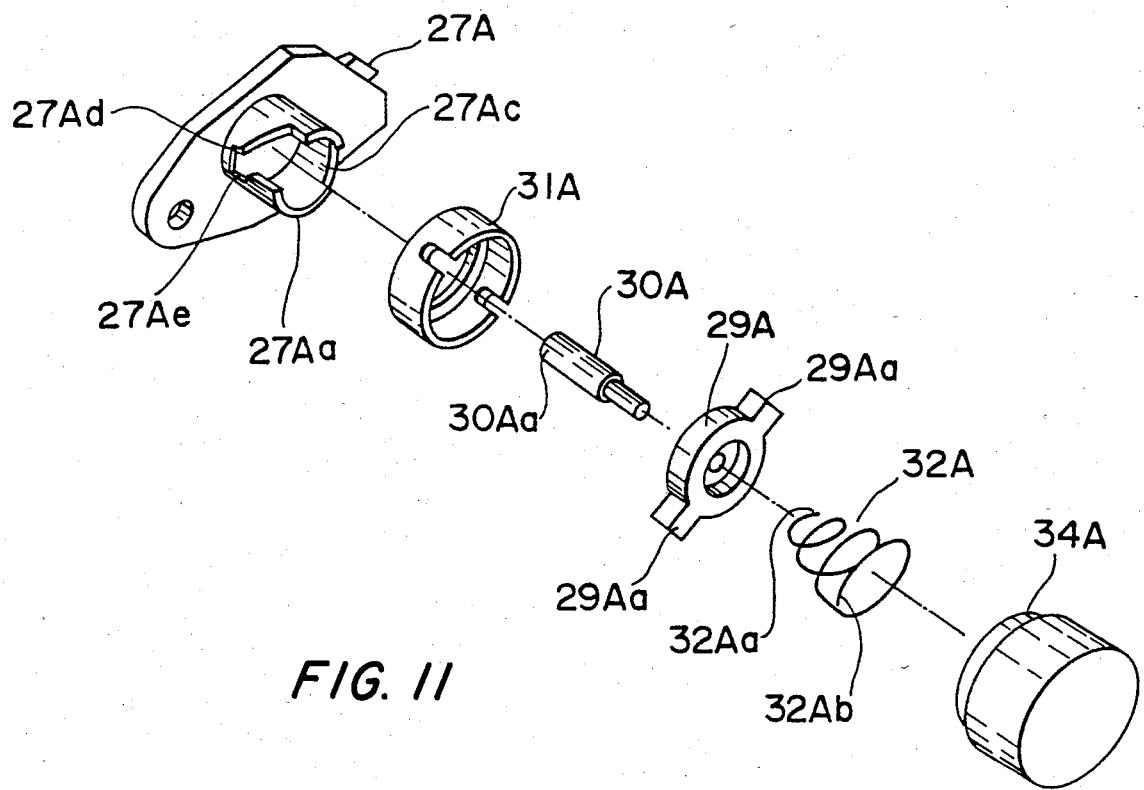
FIG. 11 is an exploded pictorial view of the operating mechanism of the embodiment of FIGS. 9 and 10.

As shown in FIGS. 3 to 6 of the drawings, the anchor assembly 16, in accordance with the present invention, comprises a rail 21 that is attached to the center pillar 15 and a lock assembly 22 that can be adjusted vertically among a multiplicity of selected positions along the length of the rail and that is stably and reliably locked to the rail by engaging with a hole e.g. 23a, in the rail at the selected position. A plurality of holes 23a, 23b, 23c and 23d are provided along the length of the rail. Each hole 23a through 23d consists of an oblong outer part 24a and a round inner part 24b. The rail also has holes 25a and 25b at the upper and lower ends for mounting the assembly on the center pillar 15. As shown in FIG. 7, the rail 21 is preferably constructed by spot-welding together two plates 21a and 21b of the same shape and separately provided with holes—this design is easier and cheaper to manufacture than is a rail made as a single plate. As shown in FIG. 8, the rail 21 may have offset portions at both ends and in this case is made in two parts 21c and 21d. The transfer member (described below) is assembled onto the part 21c and then the parts joined by means of rivets 21e.

The lock member 22 includes a slider 26 which is of oval shape in cross section with a lengthwise opening through it that receives the rail so that the slider is freely slidable along the rail. The slider 26 has a retainer 27 for the operating assembly attached at its upper end by a lug and a screw 28. As best shown in FIGS. 5 and 6, the retainer includes a cylindrical projection 27a in front, a recess 27b in back and a hole 27c through it that receives a latch pin 30. A larger diameter portion 30a of the pin carries a stopper 29 that has lugs 29a that engage the walls of the recess 27b of the retainer 27. In the clockwise position of the stopper in the recess, with reference to FIG. 6, the stopper and lock pin cannot move out from the latched position shown in FIG. 6, because the lugs engage the shallow land areas of the recess, but when rotated counterclockwise in the recess (the arrow B), the stopper and latch pin can move out from the position shown in FIG. 4 because the lugs 29a on the stopper can move out into the deeper portions 27c of the recess in the retainer.

A two-piece knob is secured to the outer end of the latch pin 30 by means of reception of the pin into a hole within a cylindrical boss on the knob part 34 (see FIG. 4). The other part 31 of the knob is an inner collar having a flange portion 31a that telescopically fits over a flange portion 34a of the part 34. The two parts of the knob are held together by lugs 31b on the part 31 that snap into recesses 34b in the part 34.

The knob 31–34 and the lock pin 30 are spring-loaded axially of the pin toward the rail 21 and also rotationally counterclockwise (looking toward the assembly as viewed in FIG. 3) so that the latch pin is normally held in a selected hole 23 in the rail and is blocked from moving out by the stopper 29. In particular, the end 32a of a spiral spring 32 is suitably fastened to the part 31 of the knob, and the other end 32b is fastened to a reaction disc 33 that is affixed to the retainer.

Referring to FIG. 4, the belt anchor 14, which is a ring through which the belt can slide, is mounted on the slider by a bolt and nut 36, a bushing 35 and a plate 37. The anchor can pivot in and out relative to the plate 37, and the plate can pivot on the bushing such that the anchor will automatically attain a position that enables the belt to lie smoothly and freely move through the anchor 14. A cover 38 fits over the above-described components.

The mode of operation of the embodiment of FIGS. 3 to 7 is as follows:

When the anchor assembly is positioned with the latch pin received in a selected hole 23 in the rail 21, as shown in FIG. 4, the belt can be done up by engaging the buckle tongue plate 17 with the buckle. The belt 10 can slide easily through the anchor 14. With a retractor of the emergency locking type, the occupant can lean forward or change position, and the belt will automatically extend and retract accordingly.

In an emergency, such as a collision, the locking mechanism of the retractor will lock the belt reel, which will prevent the belt from unwinding, and the belt will, therefore, restrain the occupant from being thrown forward. The latch pin 30 keeps the slider 26 from moving along the rail under the force applied by the belt. In the engaged position (FIG. 4), the pin 30 extends through aligned holes in the front and back walls of the slider, which provides good load distribution between the pin and slider. The spring 32 of the latch assembly retains the pin 30 and stopper 29 in the counterclockwise position, in which the stopper lugs 29a engage the shallow land areas of the recess 27b in the retainer 27, so that even if there are vibrations or abrupt forces, the latch pin cannot move out the hole in the rail.

If the occupant wants to adjust the fit of the shoulder belt, he or she rotates the knob clockwise against the torsion force of the spring 32, which moves the stopper lugs 29a to the position in the recess 27b in register with the deeper portions 27c'. The knob and latch pin can then be pulled out (the direction of the arrow B in FIG. 4) against the compression force of the spring 32, thereby moving the latch pin out of the hole in the rail. The slider 26 can now be moved up or down the rail to approximately the desired new position. The knob is then released, and if the latch pin is not then in one of the holes, a small movement up or down will align the pin with an oblong portion 24a of a hole 23. The spring 32 automatically moves the pin 30 into the hole. If the pin does not enter the round part 24b of the hole at this point, a small downward movement of the slider will be needed to set the pin. Preferably, the occupant will move the slider down manually as the last adjustment step, but the first use of the belt after adjustment of the slider will result in the final downward movement. The oblong portion of each hole provides time for the spring 32 to move the pin into a hole so that the slider will not overrun a hole, even if slided rapidly along the rail. Once the pin 30 is fully seated in a hole 32, the torsion force of the spring 32 will rotate the pin to the stopped position.

The embodiment shown in FIGS. 9 to 12 is the same as the embodiment of FIGS. 3 to 7, except for a different operating assembly, and the same reference numerals are applied to FIGS. 9 to 12 as used in FIGS. 3 to 7 but with the letter "A" added to the components that are different. An enlarged end portion 30Aa of a latch pin 30A is received through holes in the slider 26 and a selected hole 23 in the rail 21 and extends out from the slider through the center hole 27Ac of a cylindrical projection 27Aa of a retainer 27A affixed to the slider. A stopper 29A and an operating knob composed of two telescopically interfitting parts 31A and 34A are affixed to the pin 30A. Lugs 29Aa on the stopper 29A project into oppositely located spiral slots 27Ad formed in the projection 27A. One end 32Aa of a spiral spring 32A is suitably affixed to the stopper 29A and the other end 32Ab is suitably affixed to the projection 37Ac on the retainer 27A, whereby an axial force is applied to the knob and pin urging them toward the rail to keep the pin in a selected hole in the rail and a rotational force is applied counterclockwise to the pin to keep a pair of lugs 29Aa on the stopper in a pair of retaining holes 27Ac at the inner ends of the slots 27Ad in the projection 27Ac.

Figure 12:
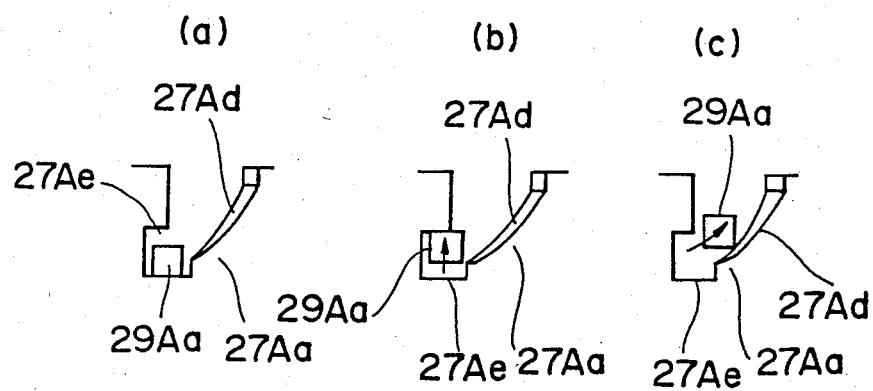
FIG. 12 depicts in three generally schematic views the operation of the operating mechanism of the embodiment of FIGS. 9 and 10.

In the latched condition which is shown in FIG. 10 and diagram (a) of FIG. 12, the pin 30A is retained in the slot 23 because it cannot rotate or move out axially because of the shapes of the holes 27Ac. Only by first pulling the knob out (diagram b of FIG. 12) and then rotating it clockwise (diagram c of FIG. 12) in sequence or simultaneously and against the axial and torsional force components applied by the spring 32A can the pin be disengaged from a hole so that the anchor assembly can be moved to another position along the rail. When the pin is released, it is rotated and pushed in to the latched position in a hole in a manner similar to that described above in connection with the embodiment of FIGS. 3 to 7.

The operating assemblies of the two embodiments of the invention described above and shown in FIGS. 3 to 12 are merely exemplary and can be replaced by any of a number of equivalent mechanisms that function in a similar way to produce a similar result. FIGS. 13 to 16 show some concepts for equivalent mechanisms in schematic form.

Figure 13:
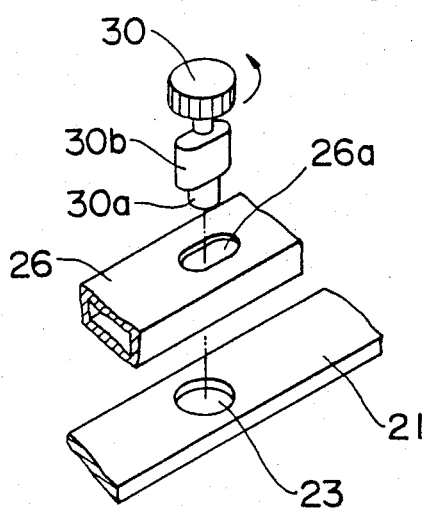
FIG. 13 is an exploded pictorial view of another form of operating mechanism.

In FIG. 13, the slider has a retainer with an oblong recess (represented by the hole 26a) and the lock pin 30 has a correspondingly shaped stopper 30b. The pin can be pulled out only when the stopper is in registration with the recess. Leaf springs can bias the pin to the latched position.

Figure 14:
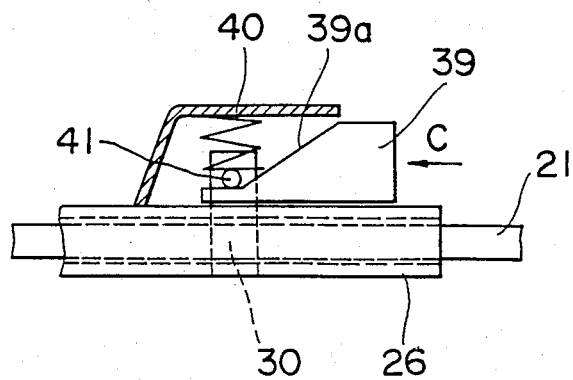
FIG. 14 is a side elevational view, partly broken away, in cross section of still another form of operating mechanism.

According to FIG. 14, a laterally movable operator 39 has a camming surface 39a that works against a follower pin 41 on the latch pin when pushed in the direction indicated by the arrow C, thereby urging the latch pin 30 out of the hole in the rail against the force of a spring 40 engaged between the pin 41 and the retainer.

Figure 15:
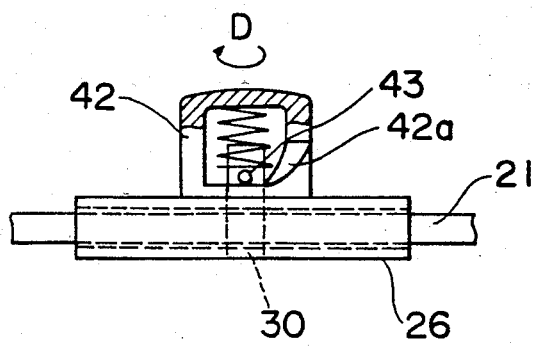
FIG. 15 is a side elevational view, partly broken away in cross-section, of another form of operating mechanism.

FIG. 15 shows the concept of the knob 42 rotatably mounted on the slider and having internal spiral cam grooves 42a that work against a follower pin 43 on the latch pin 30. When rotated, as indicated by the arrow D, the knob forces the pin out against the force of a spring. When the knob is released, the spring pushes the latch pin into the selected hole.

Figure 16:
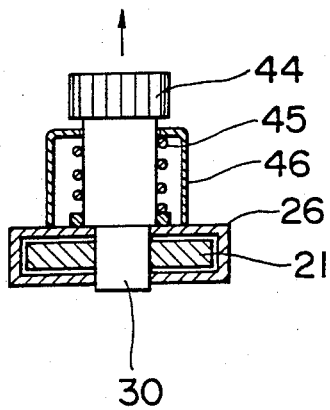
FIG. 16 is an end cross-sectional view of another form of operating mechanism.

The concept of FIG. 16 involves a latch pin 30 urged into the latched position by a spring 45 engaged between a retainer 46 and a snap ring on the pin. The pin is pulled out of the hole in the rail 21 by grasping and pulling out a knob 44 on the pin, as shown by the arrow.

The invention provides for stable positioning of the belt anchor ring, regardless of forces on the belt and vibrations or abrupt motions of the vehicle. Adjustment of the position of the anchor ring is, nonetheless, accomplished quickly and easily.

I claim:

1. A seat belt anchor assembly comprising a rail having a plurality of holes spaced-apart in a row lengthwise of the rail, a slider movable along the rail and having a hole positioned to register with any selected one of the holes in the rail, a locking arrangement including a manually operable latch pin receivable through the hole in the slider and any selected one of the holes in the rail by which the slider is latched to the rail against movement from a selected position and an anchor ring connected to the slider for guiding the belt characterized in that the locking arrangement includes an operating assembly carried by the slider that includes a retainer affixed to the slider and having a cylindrical portion surrounding the latch pin and extending outwardly from the slider, a stop member affixed to the latch pin and received within the cylindrical portion of the retainer, at least one stop lug on the stop member engageable in a first rotational position of the latch pin with a stop shoulder on the cylindrical portion to prevent the pin from moving out of an engaged position in a hole in the rail and disengageable from the stop shoulder in a second rotational position of the latch pin to enable the pin to be disengaged from the selected hole in the rail, and a spring urging the latch pin and stop member axially toward the engaged position of the latch pin and rotationally toward the first rotational position of the stop lug.

2. An anchor assembly according to claim 1 and further characterized in that the holes in the rail are stepped, the front portion being axially elongated and the back portion being cylindrical.

3. An anchor assembly according to claim 1 wherein the slider surrounds the rail and has front and back walls and further characterized in that in the engaged position the pin projects through holes in both the front and back walls of the slider for load distribution.

* * * * *